US007022943B1

(12) United States Patent
Barta

(10) Patent No.: US 7,022,943 B1

(45) Date of Patent: Apr. 4, 2006

(54) ENGINE BLOCK HEATER SYSTEM AND METHOD OF OPERATION

(76) Inventor: Justin M. Barta, 11 Williamson Ave., Fallsington, PA (US) 19054

( * ) Notice: Subject to any disclaimer, the term of this patent is extended or adjusted under 35 U.S.C. 154(b) by 0 days.

(21) Appl. No.: 10/724,419

(22) Filed: Dec. 1, 2003

(51) Int. Cl.
*B60L 1/02* (2006.01)

(52) U.S. Cl. ...................... 219/205; 219/202; 219/494; 219/497; 219/508; 340/438; 340/933; 340/938

(58) Field of Classification Search ................ 219/202, 219/205, 494, 497, 508, 505, 499; 340/438, 340/253, 449, 501, 584, 933, 938; 123/142.3 E
See application file for complete search history.

(56) References Cited

U.S. PATENT DOCUMENTS

| | | | | |
|---|---|---|---|---|
| 3,744,046 A | | 7/1973 | Tamasi | 340/253 |
| 4,002,882 A | * | 1/1977 | McCutchen | 219/499 |
| 4,363,958 A | * | 12/1982 | Kobayashi et al. | 219/505 |
| 5,115,116 A | | 5/1992 | Reed | 219/202 |
| 5,210,393 A | * | 5/1993 | Shier | 219/205 |
| 5,900,804 A | * | 5/1999 | Yewell | 340/425.5 |
| 6,218,643 B1 | * | 4/2001 | Iwata et al. | 219/202 |
| 6,225,893 B1 | | 5/2001 | Caissie | 340/438 |
| 6,384,386 B1 | * | 5/2002 | Hashimoto et al. | 219/497 |

FOREIGN PATENT DOCUMENTS

| | | |
|---|---|---|
| IT | 0370964 | * 10/1989 |

* cited by examiner

*Primary Examiner*—Robin O. Evans
*Assistant Examiner*—Leonid M. Fastovsky
(74) *Attorney, Agent, or Firm*—Lamorte & Associates

(57) ABSTRACT

An engine block heating system for a vehicle and the associated method of its operation. The engine block heating system has an electrical heating element that is coupled to the vehicle's engine. A power cord is provided for supplying electricity to the electrical heating element from a source external to the vehicle. A sensor is provided for detecting whether or not the power cord is connected to the vehicle. A disruption switch is coupled to both the starting circuit of the vehicle and the sensor. The disruption switch disrupts the starting circuit of the vehicle when the sensor detects that the power cord is connected to the vehicle. As such, the vehicle cannot be started when the power cord of the engine block heating system is attached to the vehicle.

6 Claims, 2 Drawing Sheets

ENGINE BLOCK HEATER SYSTEM AND METHOD OF OPERATION

BACKGROUND OF THE INVENTION

1. Field of the Invention

The present invention generally relates to engine block heaters that are used to keep the engine of an automobile warm when the automobile is not running. More particularly, the present invention relates to engine block heaters with safety features that are intended to prevent the automobile from being used while the engine block heater is in operation.

2. Description of the Prior Art

In many areas of the world, temperatures fall well below freezing for many months out of the year. In many such locations, there are days when temperatures dip below zero degrees Fahrenheit. During such extreme cold weather, it is difficult to start an engine of a typical stock-model automobile. In such extreme cold weather, the power of the automobile's battery is diminished. Furthermore, the oil in the engine becomes highly viscous and thus the crankshaft becomes hard to turn. The temperature weakened battery often lacks the power needed to turn an engine through the thick oil and the engine fails to start. The cold weather also greatly affects the ability of diesel engines to cause combustion. In extreme cold weather, many commercial diesel engines lack the starting power needed to create enough engine compression to ignite the diesel fuel and start the engine.

In areas where extreme cold temperatures are common, many people keep their automobiles in heated garages. However, not everyone has access to a heated garage. Many times such people use block heaters in their automobiles. Block heaters are electrical heating elements that heat the oil and liquid coolant contained within the automobile's engine. By heating the oil and the engine coolant, the oil is kept thin and the coolant unfrozen. The engine can therefore be started easily regardless of the outside temperature.

Traditional block heaters are electrically powered and require that an electrical extension cord lead to the engine of the automobile. A problem occurs when people forget to disconnect the electrical cord that powers the block heater and drive the automobile while the electrical cord is still connected. When this happens, the electrical cord pulls taut and violently disconnects. This often causes damage to the automobile, the electrical receptacle and/or the cord connecting the automobile to the electrical receptacle.

Over the years, various systems have been developed to inform a driver that the vehicle they have entered contains an electrical block heater and is currently plugged into a receptacle with an extension cord. For instance, in U.S. Pat. No. 3,744,046 to Tamasi, entitled Engine Heater Monitor And Control System, a system is shown that uses different colored lights to inform a driver about the status of a block heater. Similar systems are shown in U.S. Pat. No. 5,115,116 to Reed, entitled Vehicle Preheating System and U.S. Pat. No. 6,225,893 to Caissia, entitled Alarm System For Engine Block Heater. In both the Reed patent and the Caissia patent, systems are shown that provide alarm signals if the automobile is started while the engine block heater is still engaged.

A problem associated with the prior art systems is that a person who is in a hurry may start an automobile and drive the vehicle a few feet before they notice an alarm light or alarm signal. This is particularly true if the automobile is parked in a garage and a person is turned to look backwards as they back the automobile out of the garage. By the time a person turns to see a warning light on a dashboard, a person may have already caused serious damage to the automobile, the wall power receptacle and/or the cord that leads to the engine block heater.

A need therefore exists for an improved engine block heater system that prevents the automobile from being started when the engine block heater is in operation. In this manner, the automobile cannot be inadvertently driven away while the engine block heater is still connected to an outlet. Furthermore, by preventing the automobile from starting while the engine block heater is in use, the driver of the automobile is provided with the ultimate reminder to disconnect the engine block heater from the automobile.

SUMMARY OF THE INVENTION

The present invention is an engine block heating system for a vehicle and the associated method of its operation. The engine block heating system has an electrical heating element that is coupled to the vehicle's engine. A power cord is provided for supplying electricity to the electrical heating element from an electrical power source external to the vehicle. The power cord is attached to the vehicle when the engine block heater is in use and is detached from the vehicle when the vehicle is to be driven.

A sensor is provided in the system for detecting whether or not the power cord is connected to the vehicle and is providing power to the electrical heating element. A disruption switch is coupled to both the starting circuit of the vehicle and the sensor. The disruption switch disrupts the starting circuit of the vehicle when the sensor detects that the power cord is connected to the vehicle. As such, the vehicle cannot be started when the power cord of the engine block heating system is attached to the vehicle. This prevents the vehicle from being accidentally driven while connected to an external power cord.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention system can be applied to any internal combustion engine with an electrical starter, such as an airplane, tractor or snowmobile, the present invention system is particularly well suited for use on automobiles. Accordingly, by way of example, the present invention system will be described as being applied to an automobile in order to set forth the best mode contemplated for the present invention system. However, the application of the present invention system to an automobile should not be considered a limitation of the application of the present invention system to other motorized vehicles or machinery.

Figure 1:
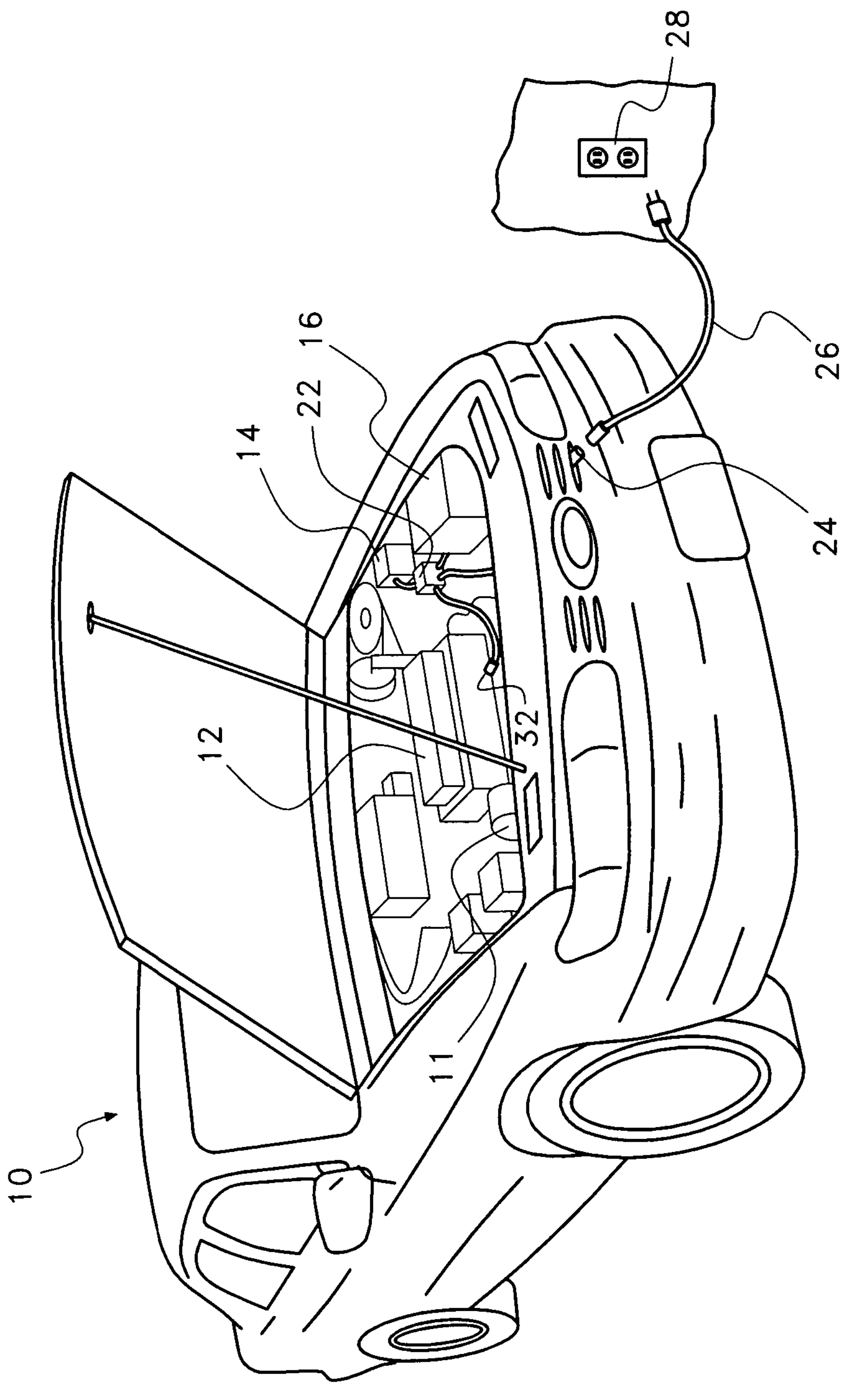
FIG. 1 is a perspective view of an automobile containing an exemplary embodiment of the present invention engine block heating system.

Referring to FIG. 1, there is shown a typical automobile 10. The automobile 10 has an engine 12 that is initially started using an electrical starter motor 11. The electrical starter motor 11 is coupled to a starting relay 14. The starting relay 14 is connected to the key ignition of the automobile 10 and the battery 16 of the automobile 10. When the key ignition is turned, the starter relay 14 connects power from the battery 16 to the electrical starter motor 11, thereby turning and starting the engine 12.

Attached to the engine 12 of the automobile 10 is at least one electrical heating element 32. The heating element is often a plug that is inserted into a bore in the block of the engine 12 near the oil pan of the engine 12. The heating element 32 is attached to a switch relay 22. The switch relay 22 is attached to a connector port 24 that is positioned on or within the front grill of the automobile 10.

A power cord 26 is provided. The power cord 26 is selectively connectable to the connector port 24, wherein the power cord 26 interconnects the connector port 24 with a wall receptacle 28.

Figure 2:
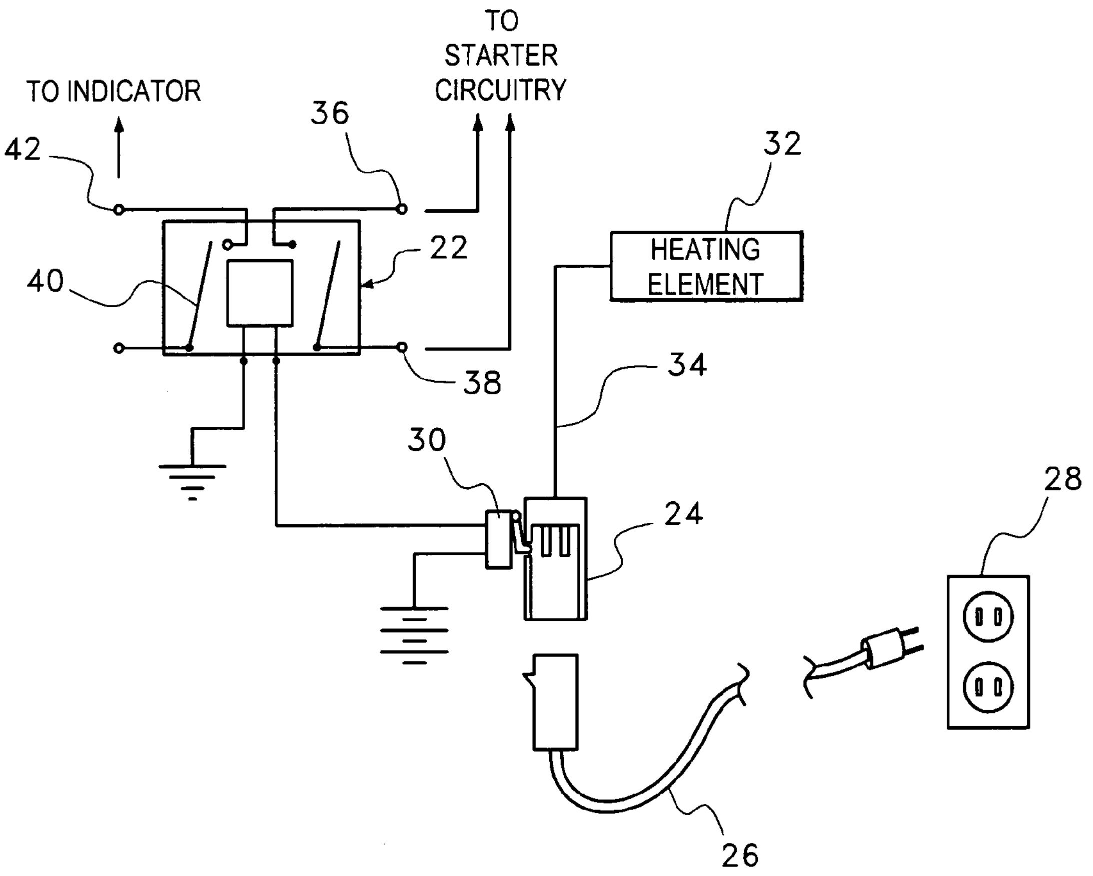
FIG. 2 is a schematic of the exemplary embodiment of the present invention engine block heating system described in FIG. 1.

Referring to FIG. 2, it can be seen that within the connector port 24 is located a sensor 30. The sensor 30 detects when the connector port 24 is attached to the power cord 26 and when the connector port 24 is not attached to the power cord 26. The physical interconnection between the connector port 24 and the power cord 26 is sensed. Thus, the sensor 30 will still detect if the power cord 26 is connected to the connector port 24 even if the power cord 26 itself is not plugged into a wall receptacle 28.

The connector port 24 receives the power cord 26 and directly connects the power cord 26 to the block heating elements 32, via a cable 34. Thus, when the power cord 26 is connected to the connector port 24 and is plugged into a wall receptacle 28, power is available for the heating elements 32.

The switch relay 22 is selectively activated and deactivated by the connection and disconnection of the power cord 26 to the connector port 24. The switch relay 22 contains an input terminal 36 and an output terminal 38. The input terminal 36 and the output terminal 38 are connected and disconnected by the workings of the switch relay 22. When the sensor 30 in the connector port 24 detects that the power cord 26 has been connected to the connector port 24, the switch relay 22 opens the connection between the input terminal 36 and the output terminal 38. Thus, there is no electrical interconnection between the input terminal 36 and the output terminal 38. However, when the power cord 26 is removed from the connector port 24, the sensor 30 detects the removal of the power cord 26 and changes the condition state of the switch relay 22. The switch relay 22 then connects the input terminal 36 to the output terminal 38.

The input terminal 36 and the output terminal 38 of the switch relay 22 are connected to one of the electrical cables that run to the starting relay 14 (FIG. 1) of the automobile 10 (FIG. 1). The switch relay 22 can be placed in series along any cable that is part of the automobile's starter circuit. This includes, but is not limited to, any cable that connects the battery to the starter relay or any cable that connects the ignition to the starter relay. By disrupting the flow of electricity in any of these cables, the automobile can be prevented from starting by the switch relay 22 of the present invention system 20.

It will therefore be understood, that when the power cord 26 is connected to the connector port 24 of the present invention system 20, the switch relay 22 is activated and the circuitry used to start the automobile is disrupted. Thus, the automobile cannot be started when the power cord 26 is connected to the automobile. As soon as the power cord 26 is disconnected from the connector port 24, the starter circuitry of the automobile operates normally and the automobile can be started. The present invention system 20, therefore, prevents the automobile from being started when the power cord 26 is connected to the connector port 24 on the automobile.

The switch relay 22 of the present invention system 20 can also control a secondary function. The switch relay 22 can contain a second switch 40 that is also selectively opened and closed by the power cord sensor 30 in the connector port 24. The second switch 40 is connected to a terminal connection 42 that can be connected to the engine computer of the automobile via a connecting cable. By selectively opening and closing the second switch 40 in the switch relay 22, the switch relay 22 can cause the engine computer to generate a warning within the automobile. The warning may be the lighting of the "Engine" light within the dashboard, or sounding any alarm buzzer that may be contained within the dashboard. Thus, in addition to the automobile not starting, the driver sitting in the automobile can be reminded that the engine block heating system is still plugged in by the visual and audible indicators enabled on the dashboard.

Alternatively, the second switch 40 of the switch relay 22 can be wired directly to a dashboard light or alarm buzzer. In this manner, the present invention system 20 can fully operate independently of the automobile's engine computer. This enables the present invention system 20 to be installed in automobiles that do not have engine computers with external access ports.

In operation, the present invention system 20 is either manufactured into an automobile or is purchased separately and is retroactively added to an automobile. When the automobile is stopped, the power cord 26 can be connected to the automobile to keep the engine warm. As soon as the power cord 26 is attached to the automobile, the starter circuit of the automobile is disabled and the automobile cannot be started. Thus, any person who forgets or is unaware that the automobile is connected to the power cord 26, cannot drive the automobile while it is still connected to the power cord 26.

If the power cord 26 is attached to the automobile, the automobile will not start. Furthermore, when the key is placed in the ignition of the automobile, the driver is presented with a warning light and/or alarm buzzer that further informs the driver that the automobile is not ready to be driven. Once the driver disconnects the power cord 26 from the automobile, the automobile automatically reverts back to its normal operating condition.

It will be understood that the embodiment of the present invention system illustrated and described is merely exemplary and that the shown schematic can be altered in many obvious ways. For example, the switch relay illustrated can be replaced with a solid state circuit containing transistors. The structure of the switch relay would therefore be different, but its function would remain the same. Furthermore, the switch relay 22 can be connected to many other circuits within the automobile instead of the starter circuit. For instance, the switch relay 22 can be coupled to the ignition coil of the automobile so that it prevents the ignition coil from working when the power cord 26 is in place. There are many other components, such as fuel injection components that can be coupled to the switch relay 22 to prevent the automobile from starting. The switch relay 22 of the present invention can be coupled to any such component in the implementation of the present invention to a specific model of automobile. All such alternate embodiments are intended to be included in the scope of the present invention as defined by the following claims.

What is claimed is:

1. An engine block heating system for an engine having an electric starting circuit, comprising:

at least one electrical heating element;

a connector port coupled to said at least one electrical heating element, wherein said at least one electrical heating element receives electricity through said connector port;

a power cord that is selectively connectable to said connector port for coupling said connector port to an external source of electricity;

a sensor at said connector port for detecting when said power cord is physically connected to said connector port;

a first terminal connection connectable to the electric starting circuit;

a second terminal connection connectable to the electric starting circuit; and a first switch coupled to said sensor, said first terminal connection and said second terminal connection for selectively connecting and disconnecting said first terminal connection and said second terminal connection, wherein said first switch disconnects said first terminal connection and said second terminal connection when said sensor detects that said power cord is coupled to said connector, and interconnects said first terminal connection and said second terminal connection when said power cord is removed from said connector.

2. The system according to claim 1, further including a second switch coupled to said sensor; wherein said second switch is selectively changed between an open state and a closed state depending upon if said sensor detects that said power cord is coupled to said connector port.

3. In a vehicle having an engine and a starting circuit used to start the engine, an engine heating system comprising:

an electrical heating element;

a power cord for supplying electricity to said electrical heating element;

a connector port where said power cord selectively interconnects to said electrical heating element;

a sensor, disposed within said connector port, for detecting if said power cord is physically connected to said electrical heating element; and a first switch coupled to the starting circuit of the vehicle and said sensor, wherein said first switch opens and disables the starting circuit while said sensor detects that said power cord is physically connected to said electrical heating element.

4. The system according to claim 3, further including a second switch coupled to an alarm indicator in said vehicle and said sensor, wherein said second switch activates said alarm indicator when said sensor detects that said power cord is physically connected to said electrical heating element.

5. In a vehicle having electrical starting circuitry and a plug-in electrical engine heating system, a method of disabling the vehicle when said plug-in electrical heating system is in use, comprising the steps of:

sensing when said plug-in electrical heating system is physically connected to a power cord that is external of said vehicle;

providing an alarm signal to a driver of said vehicle when said driver attempts to start said vehicle while said power cord is attached to said vehicle; and disabling said electrical starting circuitry while a connection to said power cord is sensed, thereby preventing said vehicle from starting until said power cord is removed.

6. The method according to claim 5, wherein said step of disabling said electrical starting circuitry includes providing a switch in said electrical starting circuitry that is selectively opened and closed by said sensor.

* * * * *